March 14, 1933.  J. HAUK  1,901,597
CLUTCH CONTROL MECHANISM
Filed Oct. 31, 1931  3 Sheets-Sheet 1

Inventor
Joseph Hauk
By
Charles & French
Attorneys

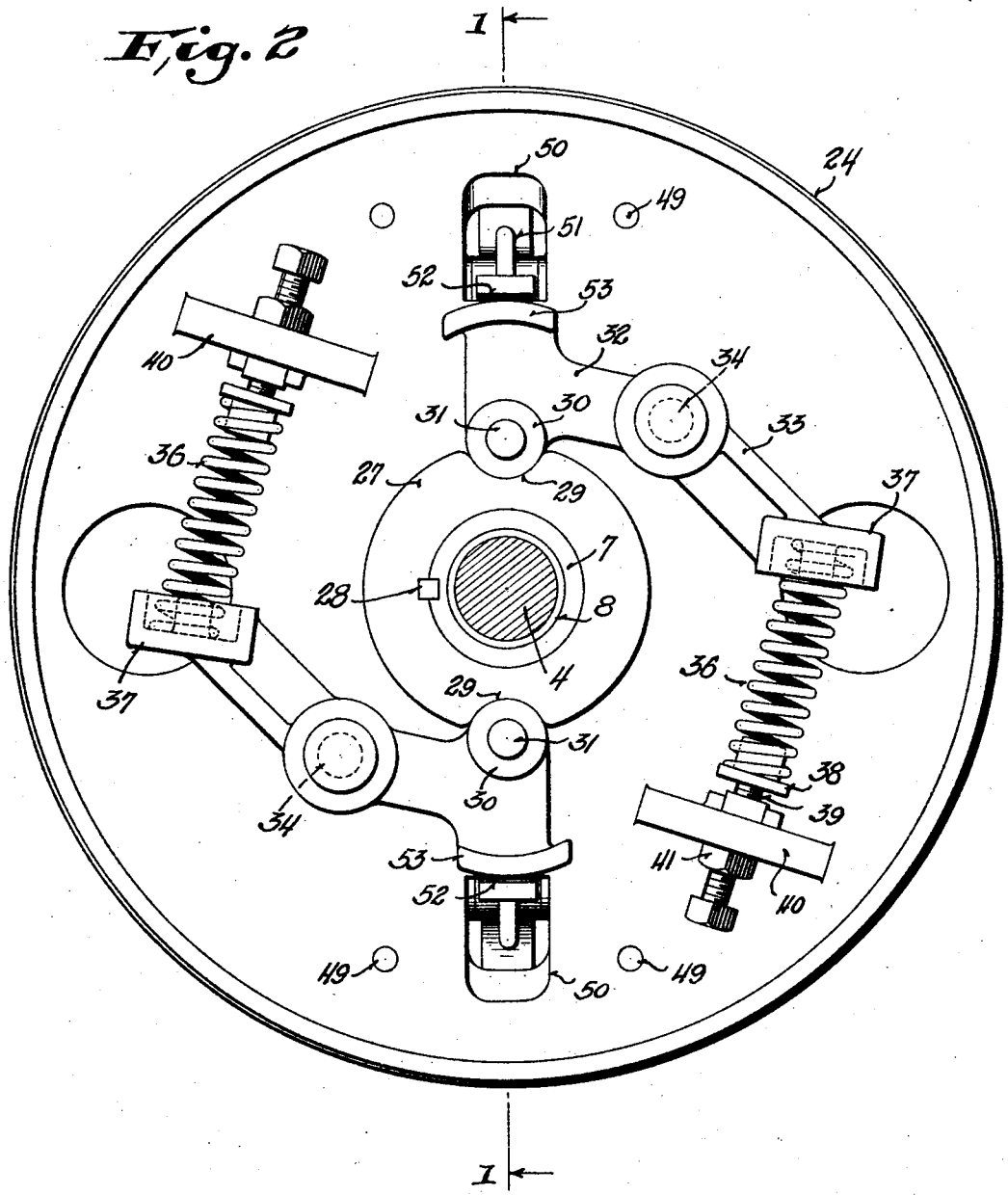

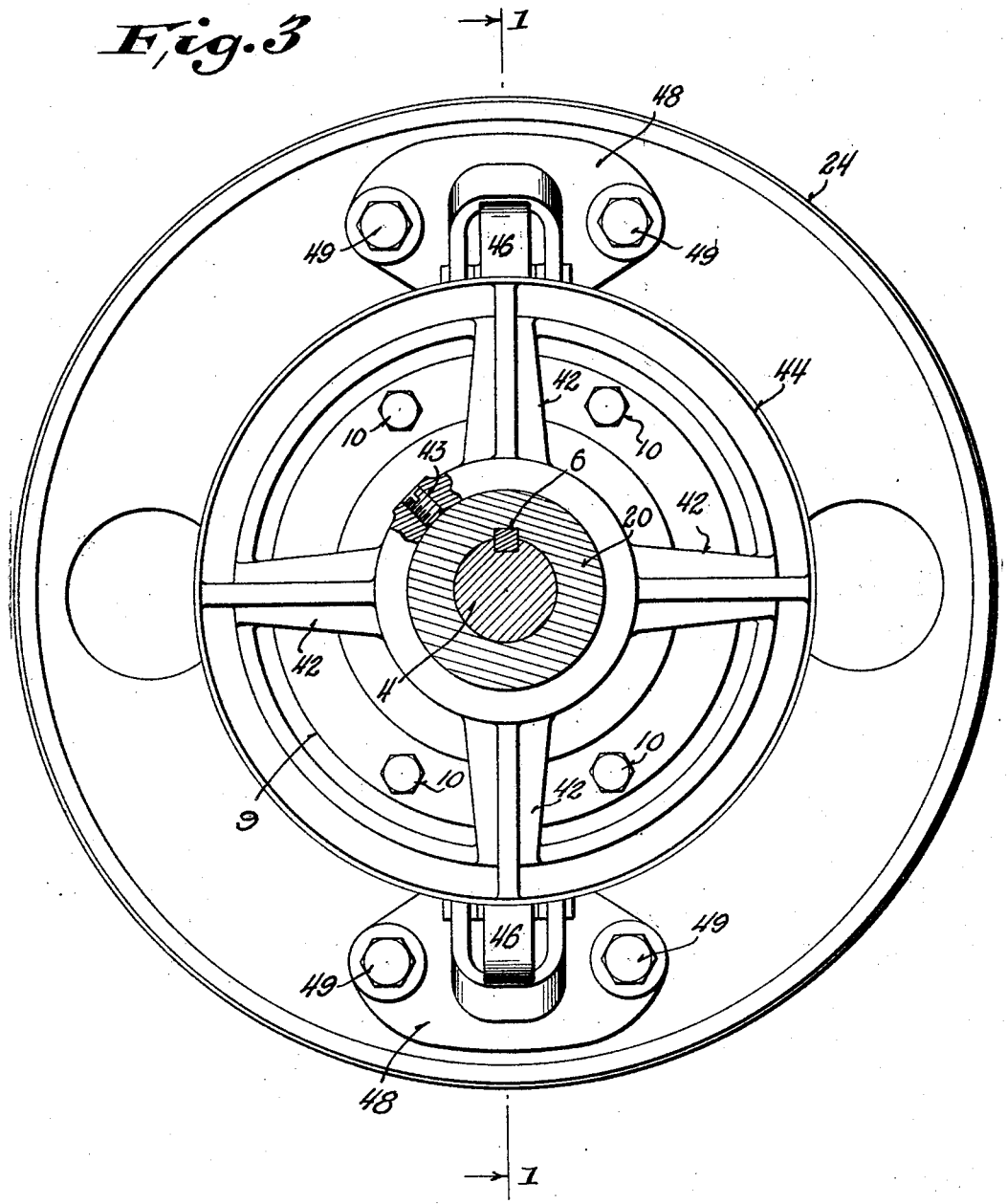

Patented Mar. 14, 1933

1,901,597

UNITED STATES PATENT OFFICE

JOSEPH HAUK, OF SHOREWOOD, WISCONSIN, ASSIGNOR TO PHILIP C. READ, OF MILWAUKEE, WISCONSIN

CLUTCH CONTROL MECHANISM

Application filed October 31, 1931. Serial No. 572,262.

The invention relates to clutches.

The general object of the invention is to associate with a clutch, a mechanism for automatically disengaging the clutch when the load reaches a previously determined excessive value, whereby under these conditions to disconnect the driven member from the driving member. More particularly the invention is designed to provide a clutch release mechanism in which the parts controlled by the excess of the load are positively operated and preferably by a cam action which on operation acts through the clutch shifter to release the clutch.

The invention further consists in the several features hereinafter set forth and more particularly defined by claims at the conclusion hereof.

In the drawings, Fig. 1 is a detail vertical view taken on the line 1—1 of Fig. 2 and of Fig. 3 respectively, parts being broken away;

Fig. 2 is an end view of the device embodying the invention as viewed along the lines 2—2 of Fig. 1;

Fig. 3 is a detail vertical sectional view taken on line 3—3 of Fig. 1.

Figure 1:
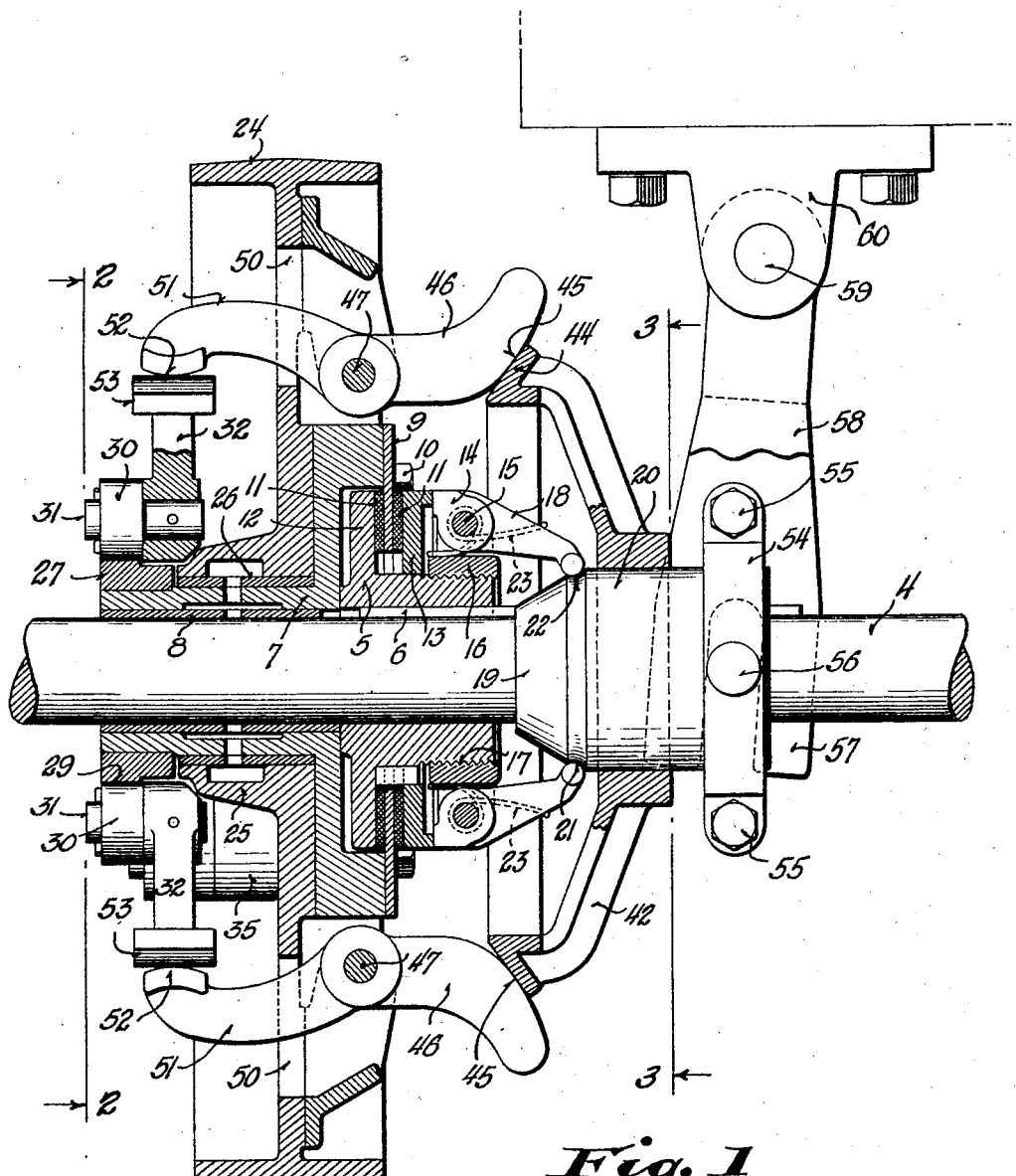

Referring to the drawings, the numeral 4 designates a drive member or shaft to which a clutch disc member 5 is secured by a key 6 and upon which shaft a clutch disc member 7 for the driven element is journalled through the bushing 8. The clutch disc 7 has a clutch plate or annular disc 9 secured thereto by bolts 10 and provided with suitable facing material 11 on opposite sides thereof, the flange portion 12 of the element 5 adapted to engage one of these faces while a clutch plate 13, slidably mounted on the hub of the member 5, is adapted to be moved into engagement with the other of the faces 11. For accomplishing this movement, cam members 14 are secured to shafts 15 mounted in suitable bearings on a collar 16 having adjustable threaded engagement at 17 with the hub of the member 5, said shafts 15 also having lever arms 18 secured thereto with which the cone shaped face 19 of a clutch control member or shifter 20, slidably mounted on the shaft 4 and keyed thereto by key 6, cooperates. The levers 15 have curved end portions 21 which when the clutch is engaged are adapted to be releasably held or maintained in engagement by registry with an annular curved groove 22 in the clutch collar or shifter 20. Coil springs 23 are associated with the arms 18 and the shafts 15 to force the levers 18 downwardly into a position for locking engagement with the recess 22, as shown in Fig. 1 of the drawings, but which on a release of the clutch collar 19 either through manual or other control as hereinafter described causes the cam 14 to turn in a radially outward direction and thus release their pressure from the clutch disc 13. When however the parts are as shown in the position of Fig. 1 with the facings 11 on the disc 9 of the driven member 7 clamped between the clutch member 12 and its associated plate 13 the shaft 4 will through this clutch connection drive the member 7. It is to be understood that the clutch mechanism just described is shown more particularly for illustrative purposes for one form of clutch to which the release mechanism embodying the invention may be applied.

A power transmitting member, forming a part of the driven element, is here shown in the form of a pulley 24 whose hub 25 is provided with a bearing bushing 26 mounted on the hub of the driven member 7 and there may be relative rotative movement between the part 7 of the driven element and said pulley.

A control cam 27 is secured by a key 28 to the hub of the member 7 and, as shown in Figs. 1 and 2, is provided with oppositely disposed locking recesses 29 adapted when the clutch is engaged to receive rollers 30 carried by pins 31 mounted on the arms 32 of levers 33 journalled intermediate their ends on pins 34, which are mounted in bosses 35 on the front face of the web of the pulley 24. The rollers 30 are urged to and normally retained in the locking position in each instance by a spring 36 interposed between the socketed end 37 of each lever 33 and a seat member 38 engaged by a threaded bolt 39 adjustably mounted in a lug 40 on the face of the pulley and held in adjusted position by a lock nut 41.

With the construction thus far described when the clutch is in engagement, the levers 32 which are carried by the power transmitting member 24 rotate with the driven member 7 through the releasable locking connection between these levers 32 and the cam member 27 which is fixed to the driven member 7.

If however the load should become excessive, tending to reduce the speed of the member 24 relative to the driven member 7, then the cam 27 will rotate relative to the pulley 24 and hence cause the surfaces of the recesses 29 to act to cam the rollers 30 out of said recesses and in so doing swing the arms 32 of the levers 33 outwardly against the pressures exerted by the springs 36. The outward movements of the levers 32 are transmitted by the connections now to be described to the clutch shifting collar or control member 20 so as to shift said collar toward the right along the driven shaft 4 as viewed in Fig. 1 and thus disengage the clutch.

Referring to Figs. 1 and 3 the clutch shifting collar 20 has a spider 42 mounted thereon with its hub secured to rotate therewith, as by means of a set screw 43, the arms of the spider carrying a conically inclined annular ring portion 44 which is adapted to be engaged by the cam shaped ends 45 of levers 46, one of these levers cooperating with one of the levers 33 in each instance. Each lever 46 is pivotally mounted on a pin 47 carried in a pivot fitting 48 secured by bolts 49 to the web of the pulley 24 which is provided with a slot 50 through which the arm 51 of the lever 46 projects and is free to work. The end 52 of the arm 51 is adapted to engage the curved end 53 of the lever 33 so that when as previously described the levers 33 move outwardly, the ends 51 of the levers 46 will be moved outwardly, thus forcing the cam faces 45 of said levers 46 inwardly, which, acting on the cone shaped portion 44 of the spider 42, will shift said spider and hence the clutch collar 20 outwardly toward the right to disengage the clutch. It will be noted that by the adjustment of the tension of the springs 36 that the part 24, carrying the levers 33, may be moved out of locking relation with the cam 27 and hence the part 7 to release the clutch under any desired predetermined force exerted by the load being driven.

For putting the clutch in engagement any suitable means may be employed and for the purposes of illustration, I have shown the clutch collar 20 provided with a sectional ring collar 54 secured to the collar 20 by bolts 55 and having diametrically disposed pins 56 engaged by the forked end 57 of a shifter fork 58 pivotally mounted on a pin 59 carried by a pivot bracket 60 adapted to be secured to any suitable fixed support, this shifted member being moved or controlled in any suitable manner so that shifting the fork 58 toward the left as in Fig. 1 causes engagement of the clutch and shifting toward the right causes disengagement when desired but does not interfere with the automatic disengagement mechanism heretofore described.

I desire it to be understood that this invention is not to be limited to any particular form or arrangement of parts except in so far as such limitations are included in the claims.

What I claim as my invention is:

1. The combination with a drive member, a driven member, a clutch for connecting said members together, and means for operating said clutch and maintaining the drive between said members including a shiftable control member, of a power transmitting member mounted to rotate with and relative to said driven member, a locking and release cam connected to said driven member, and means on said power transmitting member operable by said cam on relative movement between said last named member and said driven member to shift said shiftable control member to release said clutch.

2. The combination with a drive member, a driven member, a clutch for connecting said members together, and means for operating said clutch and maintaining the drive between said members including a shiftable control member, of a power transmitting member mounted to rotate with and relative to said driven member, a cam connected to said driven member, means on said power transmitting member operable by said cam on relative movement between said last named member and said driven member to shift said shiftable control member to release said clutch, and adjustable tension means acting on said last named means to determine the condition of load at which said cam operates to release said clutch.

3. The combination with a drive member, a driven member, a clutch for connecting said members together, and means for operating said clutch and maintaining the drive between said members including a shiftable control member, of a power transmitting member mounted to rotate with and relative to said driven member, a releasable locking connection between said power transmitting member and said driven member, and means operable through said connection on its release to shift said shiftable control member to release the clutch.

4. The combination with a drive member, a driven member, a clutch for connecting said members together, and means for operating said clutch and maintaining the drive between said members including a shiftable control member, of a power transmitting member mounted to rotate with and relative to said driven member, a releasable locking connection between said last named members including a cam on said driven member and levers on said power transmitting member, means connecting said levers with said shiftable control member to actuate the same on relative movement between said cam and said levers, and means determining the condition of the load at which said relative movement occurs.

5. The combination of a drive member, a driven member, a clutch for connecting said members together, and means for operating said clutch and maintaining the drive between said members including a shiftable control member, of a power transmitting member mounted to rotate with and relative to said driven member, a releasable locking connection between said last named members including a cam on said driven member and levers on said power transmitting member engaging said cam, adjustable spring means acting on said levers, and means connecting said levers with said shiftable control member to actuate the same on relative movement between said cam and said levers when the load is in excess of the tension of said spring means.

6. The combination with a drive member, a driven member, a clutch for connecting said members together, and means for operating said clutch and maintaining the drive between said members including a shiftable control member, of a power transmitting member mounted to rotate with and relative to said driven member, a tensioned releasable driving connection between said last named members including tensioned levers mounted on said power transmitting member, other levers mounted on said last named member engaged and moved by said first named levers, when said driving connection is released, and operatively connected to said shiftable control member to shift the same.

In testimony whereof, I affix my signature

JOSEPH HAUK